United States Patent
Das et al.

(10) Patent No.: US 10,808,177 B2
(45) Date of Patent: *Oct. 20, 2020

(54) DELAYED COKING PROCESS WITH PRE-CRACKING REACTOR

(71) Applicant: Indian Oil Corporation Limited, Bandra (East), Mumbai (IN)

(72) Inventors: Satyen Kumar Das, Faridabad (IN); Ponoly Ramachandran Pradeep, Faridabad (IN); Terapalli Hari Venkata Devi Prasad, Faridabad (IN); Arjun Kumar Kottakuna, Faridabad (IN); Madhusudan Sau, Faridabad (IN); Debasis Bhattacharyya, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

(*) Notice: Subject to any disclaimer, the term of this patent is extended or adjusted under 35 U.S.C. 154(b) by 0 days.

This patent is subject to a terminal disclaimer.

(21) Appl. No.: 15/935,828

(22) Filed: Mar. 26, 2018

(65) Prior Publication Data
US 2018/0208853 A1 Jul. 26, 2018

Related U.S. Application Data

(63) Continuation-in-part of application No. 15/237,056, filed on Aug. 15, 2016.

(30) Foreign Application Priority Data

Nov. 23, 2015 (IN) .................. 4398/MUM/2015

(51) Int. Cl.
*C10G 9/00* (2006.01)
*C10B 57/02* (2006.01)
(Continued)

(52) U.S. Cl.
CPC ........... *C10B 57/02* (2013.01); *B01J 19/1818* (2013.01); *C10B 17/00* (2013.01); *C10B 49/02* (2013.01);
(Continued)

(58) Field of Classification Search
CPC .......... C10G 9/005; C10G 9/16; C10G 55/04; C10G 51/023
See application file for complete search history.

(56) References Cited

U.S. PATENT DOCUMENTS

| | | | | |
|---|---|---|---|---|
| 4,492,625 A | * | 1/1985 | Allan ..................... | C10G 9/005 208/131 |
| 4,604,186 A | * | 8/1986 | Lutz ....................... | C10G 65/10 208/127 |

(Continued)

*Primary Examiner* — Michelle Stein
(74) *Attorney, Agent, or Firm* — Workman Nydegger

(57) ABSTRACT

The present invention relates to delayed coking of heavy petroleum residue producing petroleum coke and lighter hydrocarbon products. The invented process utilize a pre-cracking reactor and a reactor furnace for mild thermal cracking of the feedstock and an intermediate separator, before being subjected to higher severity thermal cracking treatment in a coker furnace and a coking drums, resulting in reduction in overall coke yield.

2 Claims, 4 Drawing Sheets

(51) Int. Cl.
  *C10G 7/00* (2006.01)
  *C10G 51/02* (2006.01)
  *C10B 17/00* (2006.01)
  *B01J 19/18* (2006.01)
  *C10B 49/02* (2006.01)
  *C10B 55/00* (2006.01)
  *C10B 57/04* (2006.01)

(52) U.S. Cl.
  CPC ............ *C10B 55/00* (2013.01); *C10B 57/045* (2013.01); *C10G 7/00* (2013.01); *C10G 51/023* (2013.01); *C10G 2300/107* (2013.01); *C10G 2300/1077* (2013.01); *C10G 2300/1085* (2013.01)

(56) References Cited

U.S. PATENT DOCUMENTS

| | | | | |
|---|---|---|---|---|
| 4,832,823 A | * | 5/1989 | Goyal | C10B 55/00 208/131 |
| 5,316,655 A | * | 5/1994 | Paspek | C10G 9/00 208/125 |
| 6,048,448 A | * | 4/2000 | Nirell | C10G 9/005 208/131 |

* cited by examiner

DELAYED COKING PROCESS WITH PRE-CRACKING REACTOR

CLAIM OF PRIORITY

This application is a patent of addition, or continuation of Indian Patent Application No. 4398/MUM/2015, filed on Nov. 23, 2015. The foregoing application is incorporated herein by reference.

FIELD OF THE INVENTION

The present invention relates to the coking of heavy petroleum fractions or residues. More particularly, the present invention relates to conversion of heavy residue into lighter fractions in delayed coking process which results in improved overall yield of desired products and reduction in the yield of low value coke.

BACKGROUND OF THE INVENTION

Delayed cokers are furnace-type coking units wherein the feed is rapidly heated to temperatures above coking temperature inside a furnace and the effluent from the furnace discharges (before decomposition) into a large "coke drum", where it remains until it either cracks or thermally decomposes and passes off as vapor and also condenses into coke.

In the usual application of the delayed coking process, residual oil is heated by exchanging heat with liquid products from the coking process and is then fed into a fractionating tower where any light products which might remain in the residual oil are distilled out and also mixes with the internal recycle fraction. The oil is then pumped through a furnace where it is heated to the required temperature and discharged into the bottom of the coke drum. The first stages of thermal decomposition reduce this oil to a very heavy tar or pitch which further decomposes into solid coke. The vapors formed during this decomposition produce pores and channels in the coking mass through which the incoming oil from the furnace may pass. This process continues until the drum is filled with a mass of coke. The vapors formed in the process leave from the top of the drum and are returned to the fractionating tower where they are fractionated into desired cuts.

The delayed coking heater outlet temperature is controlled in the temperature range of 900° F. to 950° F. Higher temperatures may cause rapid coking in the coking heater and shortened on-stream time. Lower temperatures produce soft coke with a high VCM content. Sufficient pressure to avoid vaporization of the feed is maintained in the heater. The residence time must be long enough to bring the oil up to the desired temperature but excess time in the heater may cause coking and result in clogging the heater coil. A method frequently used for controlling the velocity and residence time in the heating coil is to inject water (or steam) into the high-boiling petroleum oil entering the heating coil. Water or steam injection is controlled at a rate sufficient to maintain the oil velocity in the heating coil to prevent coke from forming and depositing in the coil.

Coke formation reactions are essentially endothermic with the temperature dropping to 780° F. to 900° F., more usually to 780° F. to 840° F., in the coke drum. Coke drum pressures are maintained in the range from 10 to 70 psig. To avoid the temperature limitations of delayed coking units, both moving bed and fluidized bed units have been proposed for reduced crude coking operations. Because they generally operate at lower pressures and higher temperatures than delayed cokers, more of the feed charge to fluid and contact or moving bed cokers is vaporized. The higher temperatures of fluid and contact or moving bed units also result in higher octane gasoline than that from delayed coking and in more olefinic gases. However, despite the development of these higher temperature coking processes, most commercial coking operations currently employ the delayed coking process.

The principal charging stocks for coking operations are high boiling virgin or cracked petroleum residues which may or may not be suitable as heavy fuel oils. Most of the delayed cokers in operation around the world produce fuel grade coke, which is used as an industrial fuel. Fuel grade coke prices are much lower compared to other products from coker units. Some delayed cokers produce anode grade coke for making electrodes used in aluminium industries. Prices of anode grade coke are higher compared to fuel grade coke but still lesser compared to other products from coker. Therefore, it is highly desirable to have a process which can effectively reduce the generation of coke from delayed coking process to improve the margin around the delayed coker.

Various additives have been tried in the past for reducing the yield of coke and improving the lighter product yields in delayed coking process. For example, U.S. Pat. No. 4,378,288 discloses the use of free radical inhibitors like benzaldehyde, nitrobenzene, aldol, sodium nitrate etc. with a dosage of 0.005-10.0 wt % of the feedstock which majorly has been vacuum tower bottom, reduced crude, thermal tar or a blend thereof.

Similarly, US patent publication No. 2009/0209799 discloses FCC catalysts, zeolites, alumina, silica, activated carbon, crushed coke, calcium compounds, Iron compounds, FCC Ecat, FCC spent cat, seeding agents, hydrocracker catalysts with a dosage of <15 wt % of the feed which is majorly a suitable hydrocarbon feedstock used in delayed coking of boiling point higher than 565° C. to obtain a reduction in coke yield of about 5 wt %.

U.S. Pat. No. 7,425,259 discloses a method for improving the liquid yields during thermal cracking using additives. Additives such as metal over bases of Ca, Mg, Strontium, Al, Zn, Si, Barium were used.

From the prior arts, it can be seen that an additive or a combination of additives or catalysts are being used to alter the reaction mechanism and achieve the yield improvement. It is notable that many of the additives and catalysts involve additional cost of usage. Also, their impacts on the quality of coke as well as other products are not discussed in detail in the prior arts. It is also possible that the metallic additives get trapped in the solid carbonaceous coke, increase the ash content rendering the product un-usable. Therefore, it is desirable to have a process capable to improve the yield pattern from the thermal cracking process, without the use of any forms of external additives.

SUMMARY OF THE INVENTION

A major disadvantage of the existing delayed coking unit is the high yield of low value coke as the product. The present invention provides a process resulting in improved overall yields of desired products and reduction in the yield of low value coke.

According to first embodiment of the present invention, a method of reducing overall coke yield comprises the steps of:

(a) heating a hydrocarbon feedstock [1, 20, 40, 59] in a reactor furnace [2, 21, 41, 60] to obtain hot feed [3, 22, 42, 61];

(b) introducing the hot feed [3, 22, 42, 61] of step (a) in a pre-cracking reactor [4, 23, 24, 43, 62] wherein it undergoes mild thermal cracking reactions to obtain an outlet product material stream [5, 25, 44, 63];

(c) passing the outlet product material stream [5, 25, 44, 63] of step (b) either directly to a main fractionator [69] to obtain heavy bottom fraction [64] or an intermediate separator [6, 26, 45] to split outlet product material stream into top fraction [7, 27, 46] and bottom product [8, 28, 47] and transferring the top fraction [7, 27, 46] to a main fractionator [13, 33, 53];

(d) heating the heavy bottom fraction [64] or the heavy bottom [8, 28, 47] of step (c) in a secondary furnace [9, 29, 49, 65] to obtain hot hydrocarbon stream [10, 30, 50, 66];

(e) transferring the hot hydrocarbon stream [10, 30, 50, 66] of step (d) to preheated coke drums [11, 31, 51, 67] where it undergoes severe thermal cracking reactions to obtain product vapors [12, 32, 52, 68]; and (f) passing the product vapors [12, 32, 52, 68] of step (e) to the main fractionator [13, 33, 53, 69] to obtain desired product fractions.

According to second embodiment of the present invention, a method of reducing overall coke yield comprises the steps of:

(a) heating a hydrocarbon feedstock (59) in a reactor furnace (60) to obtain hot feed (61);

(b) introducing the hot feed (61) of step (a) to a pre-cracking reactor (62), where it undergoes mild thermal cracking reactions to obtain an outlet product material stream (63);

(c) passing the outlet product material stream (63) of step (b) to a main fractionator (69), where it fractionated to a heavy bottom fraction (64);

(d) passing the heavy bottom fraction (64) of step (c) to a secondary furnace (65) to obtain hot hydrocarbon stream (66);

(e) passing the hot hydrocarbon stream (66) of step (d) to preheated coke drums (67), where it undergoes thermal cracking reactions to obtain product vapors (68); and (f) passing the product vapors (68) of step (e) to the main fractionator (69) column to obtain desired product fractions.

Various objects, features, aspects, and advantages of the present invention will become more apparent from the following drawings and detailed description of preferred embodiments of the invention.

DETAILED DESCRIPTION OF THE INVENTION

Figure 1:
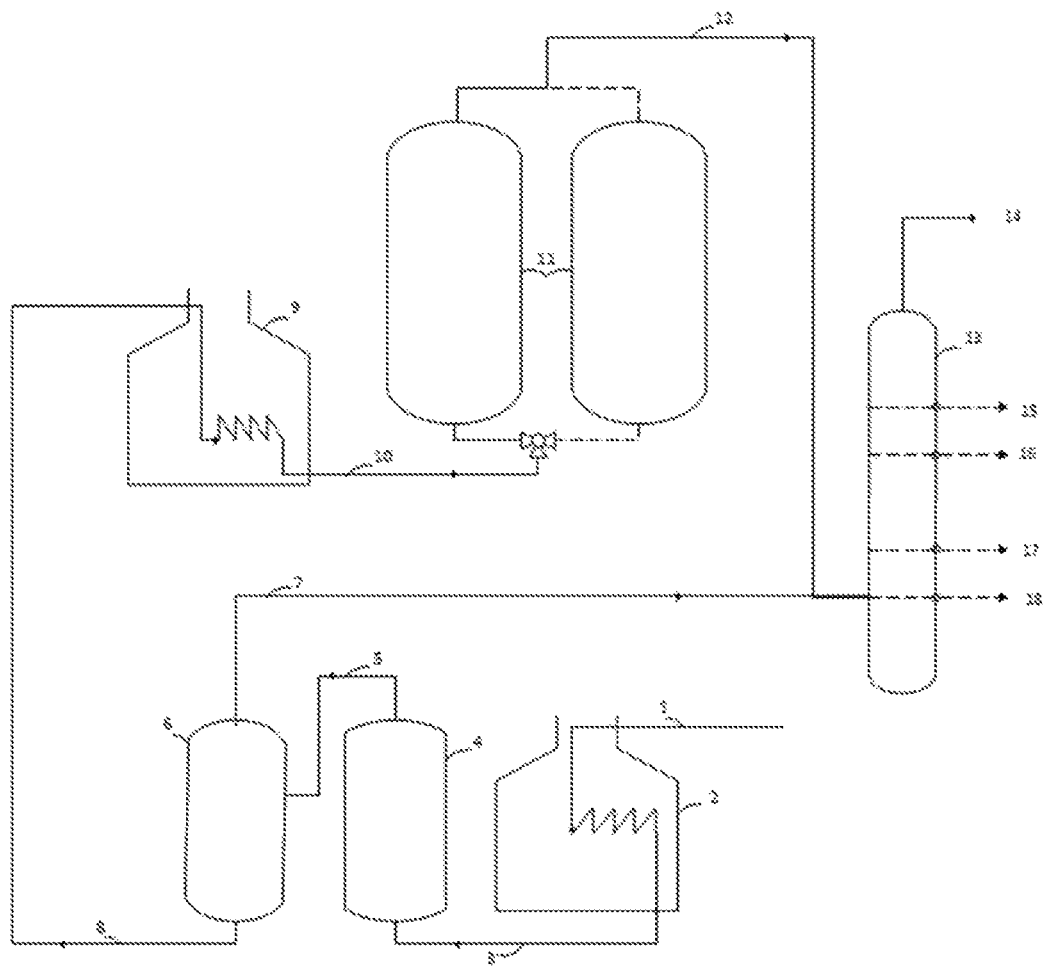
FIG. 1. Represents schematic flow diagram of First Scheme

While the invention is susceptible to various modifications and/or alternative processes and/or compositions, specific embodiment thereof has been shown by way of example in tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention. According to first embodiment of the present invention, a method of reducing overall coke yield comprises the steps of:

(a) heating a hydrocarbon feedstock [1, 20, 40, 59] in a reactor furnace [2, 21, 41, 60] to obtain hot feed [3, 22, 42, 61];

(b) introducing the hot feed [3, 22, 42, 61] of step (a) in a pre-cracking reactor [4, 23, 24, 43, 62] wherein it undergoes mild thermal cracking reactions to obtain an outlet product material stream [5, 25, 44, 63];

(c) passing the outlet product material stream [5, 25, 44, 63] of step (b) either directly to a main fractionator [69] to obtain heavy bottom fraction [64] or an intermediate separator [6, 26, 45] to split outlet product material stream into top fraction [7, 27, 46] and bottom product [8, 28, 47] and transferring the top fraction [7, 27, 46] to a main fractionator [13, 33, 53];

(d) heating the heavy bottom fraction [64] or the heavy bottom [8, 28, 47] of step (c) in a secondary furnace [9, 29, 49, 65] to obtain hot hydrocarbon stream [10, 30, 50, 66];

(e) transferring the hot hydrocarbon stream [10, 30, 50, 66] of step (d) to preheated coke drums [11, 31, 51, 67] where it undergoes severe thermal cracking reactions to obtain product vapors [12, 32, 52, 68]; and (f) passing the product vapors [12, 32, 52, 68] of step (e) to the main fractionator [13, 33, 53, 69] to obtain desired product fractions.

According to first embodiment of the present invention, in step (a) the hydrocarbon feedstock [20, 40] is a hot feed mixed with an internal recycle stream which is obtained by passing a resid feed stock [19, 39] to bottom section of the main fractionator [33, 53].

According to first embodiment of the present invention, in step (a) the heavy bottom [47] is mixed with CLO stream [48] prior to heating in the secondary furnace [49].

According to first embodiment of the present invention, the hot feed [22] of step (a) is distributed in multiple pre-cracking reactors [23, 24] wherein it undergoes mild thermal cracking reactions to obtain an outlet product material stream [25].

According to second embodiment of the present invention, a method of reducing overall coke yield comprises the steps of:

(a) heating a hydrocarbon feedstock (59) in a reactor furnace (60) to obtain hot feed (61);

(b) introducing the hot feed (61) of step (a) to a pre-cracking reactor (62), where it undergoes mild thermal cracking reactions to obtain an outlet product material stream (63);

(c) passing the outlet product material stream (63) of step (b) to a main fractionator (69), where it fractionated to a heavy bottom fraction (64);

(d) passing the heavy bottom fraction (64) of step (c) to a secondary furnace (65) to obtain hot hydrocarbon stream (66);

(e) passing the hot hydrocarbon stream (66) of step (d) to preheated coke drums (67), where it undergoes thermal cracking reactions to obtain product vapors (68); and (f) passing the product vapors (68) of step (e) to the main fractionator (69) column to obtain desired product fractions.

According to first and second embodiment of the present invention, the product fraction separated from the fractionator [13, 33, 53, 69] are offgas comprising fuel gas, LPG and naphtha [14, 34, 54, 70], Kerosene [15, 35, 55, 71], LCGO [16, 36, 56, 72], HCGO [17, 37, 57, 73] and CFO [18, 38, 58, 74].

According to first and second embodiment of the present invention, the pre-cracking reactor [4, 23, 24, 43, 62] is a Plug Flow Reactor (PFR).

According to first and second embodiment of the present invention, the pre-cracking reactor [4, 23, 24, 43, 62] is operated at a temperature range of 370 to 470° C.

According to first and second embodiment of the present invention, the pre-cracking reactor [4, 23, 24, 43, 62] is operated at a pressure range of 1 to 25 Kg/cm².

According to first and second embodiment of the present invention, residence time of the hot feed [3, 22, 42, 61] in the pre-cracking reactor [4, 23, 24, 43, 62] is in the range of 1 to 50 minutes.

According to first and second embodiment of the present invention, the intermediate separator [6, 26, 45] is operated in the pressure range of 0.2 to 10 Kg/cm².

According to first and second embodiment of the present invention, the coke drums [11, 31, 51, 67] are operated at a temperature ranging from 470 to 520° C.

According to first and second embodiment of the present invention, the coke drums [11, 31, 51, 67] are operated at a pressure ranging from 0.5 to 5 Kg/cm².

According to first and second embodiment of the present invention, residence time of the hot hydrocarbon stream [10, 30, 50, 66] in the coke drum [11, 31, 51, 67] is more than 10 hours.

According to first and second embodiment of the present invention, the hydrocarbon feedstock [1, 20, 40, 59] is selected from vacuum residue, atmospheric residue, deasphalted pitch, shale oil, coal tar, clarified oil, residual oils, heavy waxy distillates, foots oil, slop oil or blends of hydrocarbons.

According to first and second embodiment of the present invention, the hydrocarbon feedstock [1, 20, 40, 59] has conradson carbon residue content of above 4 wt % and density of at least 0.95 g/cc.

Feedstock

The liquid hydrocarbon feedstock to be used in the process is selected from heavy hydrocarbon feedstocks like vacuum residue, atmospheric residue, deasphalted pitch, shale oil, coal tar, clarified oil, residual oils, heavy waxy distillates, foots oil, slop oil or blends of such hydrocarbons. The Conradson carbon residue content of the feedstock is above 4 wt % and minimum density of 0.95 g/cc.

Reaction Conditions

In the process of the present invention, the pre-cracking reactor may be operated in the desired operating temperature ranging from 370° C. to 470° C., preferably between 420° C. to 470° C. and desired operating pressure inside pre-cracking reactor ranging from 1 to 25 Kg/cm² (g), preferably between 5 to 18 Kg/cm² (g). The residence time inside the pre-cracking reactor range from 1 to 50 minutes, preferably operated in the range of 10 to 40 minutes. The intermediate separator may be operated at a pressure ranging from 0.2 to 10 Kg/cm² (g), preferably in the range of 1 to 6 Kg/cm² (g). The second stage coke drums may be operated at a higher severity with desired operating temperature ranging from 470 to 520° C., preferably between 480° C. to 500° C. and desired operating pressure ranging from 0.5 to 5 Kg/cm² (g) preferably between 0.6 to 3 Kg/cm² (g). The residence time provided in coke drums is more than 10 hours.

Process Description

A schematic process flow diagram of the invented process is provided as FIG. 1. Resid feedstock (1) is heated in a reactor furnace (2) to get the hot feed (3) at the desired inlet temperature of the pre-cracking reactor. Hot feed at desired temperature and pressure is sent to the pre-cracking reactor (4), preferably a plug flow reactor (PFR) which is operating at a temperature range of about 370° C. to 470° C. and pressure range of about 1 to 18 Kg/cm², where it undergoes mild thermal cracking reactions. The outlet product material stream (5) is then sent to the intermediate separator (6) to split the hydrocarbons into two fractions. The top fraction (7) containing lighter products including gases are sent to the main fractionator (13). The bottom product (8) is then subjected to heating in a coker furnace (9) to the desired coking temperature. The hot hydrocarbon stream (10) exiting the furnace is then sent to the preheated coke drum (11), where it is provided with a longer residence time for thermal cracking reactions. The product vapors (12) exiting the coke drum are sent to the main fractionator column (13) for further separation into desired product fractions like offgas with LPG and naphtha (14), Kerosene (15), Light Coker Gas Oil (LCGO) (16), Heavy Coker Gas Oil (HCGO) (17) and Coker Fuel Oil (CFO) (18). The entry points of products from intermediate separator and coke drum to the main fractionators may be suitably selected based on good engineering practices.

Figure 2:
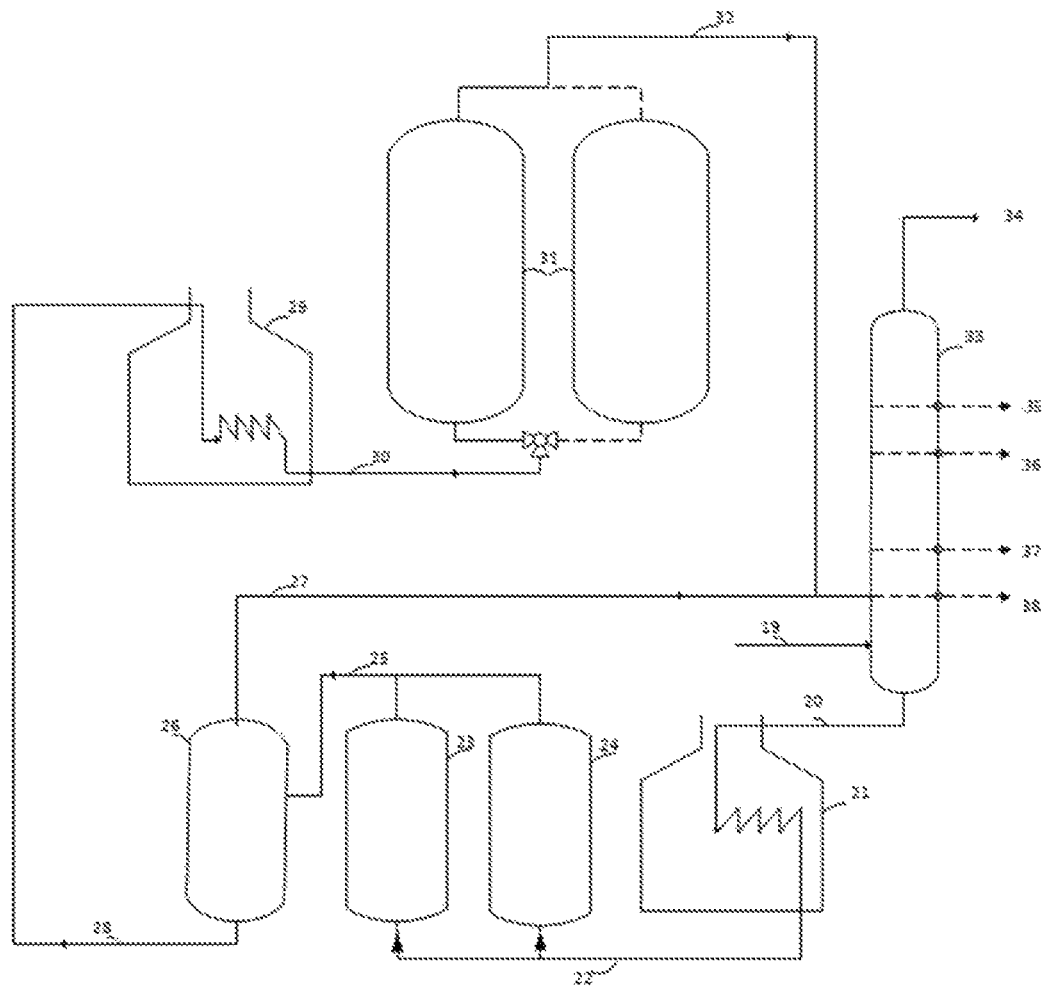
FIG. 2. Represents schematic flow diagram of Second Scheme

An embodiment of the invention is provided in FIG. 2. Resid feedstock (19) is first sent to the bottom section of the main fractionator (33) to get the hot feed (20) mixed with the internal recycle stream. The hot feed (20) is then heated in a reactor furnace (21) to get the hot feed (22) at the desired inlet temperature of the pre-cracking reactors (23) and (24). Hot feed at desired temperature and pressure is sent to multiple pre-cracking reactors (23) and (24), preferably plug flow reactors (PFR), where it undergoes mild thermal cracking reactions. The combined outlet product material stream (25) from pre-cracking reactors is then sent to the intermediate separator (26) to split the hydrocarbons into two fractions. The top fraction (27) containing lighter products including gases are sent to the main fractionator (33). The bottom product (28) is then subjected to further heating in a coker furnace (29) to the desired coking temperature. The hot hydrocarbon stream (30) exiting the furnace is then sent to the preheated coke drum (31), where it is provided with a longer residence time for delayed coking reactions. The product vapors (32) exiting the coke drum are sent to the main fractionator column (33) for further separation into desired product fractions like offgas with LPG and naphtha (34), Kerosene (35), Light Coker Gas Oil (LCGO) (36), Heavy Coker Gas Oil (HCGO) (37) and Coker Fuel Oil (CFO) (38). The entry points of products from pre-cracking reactor and coke drum to the main fractionator may be suitably selected based on good engineering practices.

Figure 3:
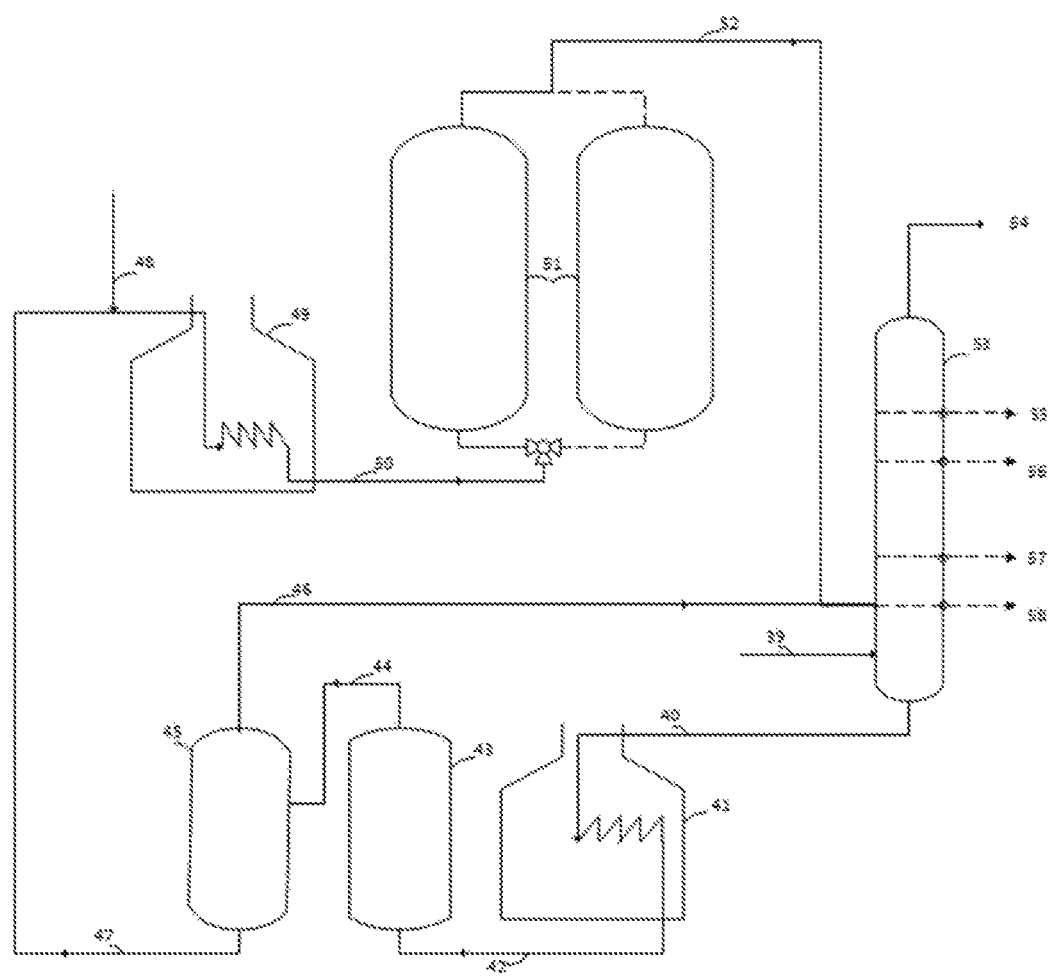
FIG. 3. Represents schematic flow diagram of Third Scheme

Another embodiment of the invention is provided in FIG. 3. Resid feedstock (39) is first sent to the bottom section of the main fractionator (53) to get the hot feed (40) mixed with the internal recycle stream. The hot feed (40) is then heated in a reactor furnace (41) to get the hot feed (42) at the desired inlet temperature of the pre-cracking reactor (43). Hot feed at desired temperature and pressure is sent to pre-cracking reactor (43), preferably a plug flow reactor (PFR), where it undergoes mild thermal cracking reactions. The outlet product material stream (44) from pre-cracking reactor is then sent to the intermediate separator (45) to split the hydrocarbons into two fractions. The top fraction (46) containing lighter products including gases are sent to the main fractionator (53). The bottom product (47) is then subjected to further heating in a coker furnace (49) to the desired coking temperature. In the coker furnace a Clarified Oil (CLO) stream (48) is added to enhance the stability of the heavy hydrocarbon stream during heating. The hot hydrocarbon stream (50) exiting the coker furnace is then sent to the preheated coke drum (51), where it is provided with a longer residence time for delayed coking reactions. The product vapors (52) exiting the coke drum are sent to the main fractionator (53) column for further separation into desired product fractions like offgas with LPG and naphtha (54), Kerosene (55), Light Coker Gas Oil (LCGO) (56), Heavy Coker Gas Oil (HCGO) (57) and Coker Fuel Oil (CFO) (58). The entry points of products from pre-cracking reactor and coke drum to the main fractionator may be suitably selected based on good engineering practices.

Figure 4:
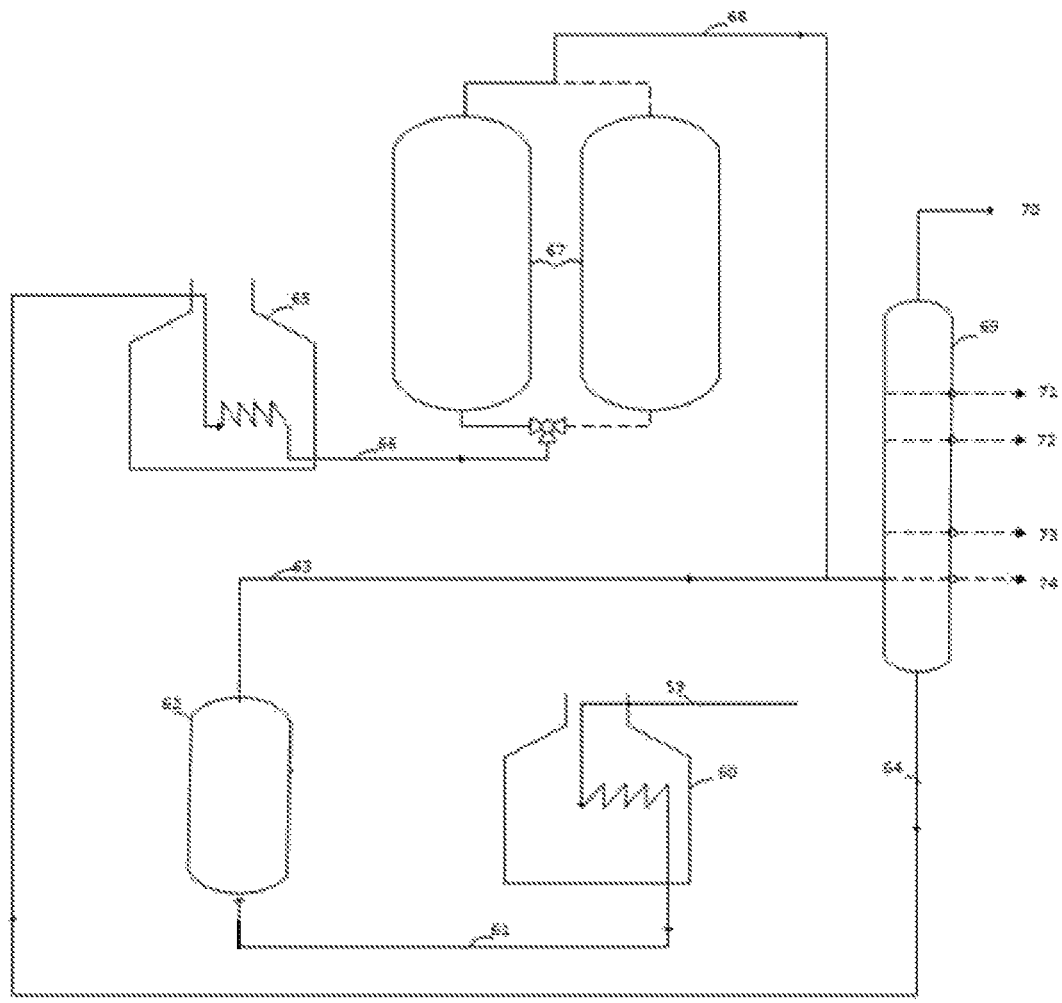
FIG. 4. Represents schematic flow diagram of Fourth Scheme

Yet another embodiment of the invention is provided in FIG. 4. In the process scheme described in FIG. 4, resid feedstock (59) is heated in a reactor furnace (60) to get the hot feed (61) at the desired inlet temperature of the pre-cracking reactor (62) preferably a plug flow reactor (PFR). Hot feed at desired temperature and pressure is sent to the pre-cracking reactor (62), where it undergoes mild thermal cracking reactions. The outlet product material stream (63) is then sent to bottom section of the main fractionator (69) along with the internal recycle stream (68). Heavier bottom material (64) from the main fractionator column (69) is sent to a coker furnace (65) for heating to the desired coking temperature. The hot hydrocarbon stream (66) exiting the coker furnace is then sent to the preheated coke drum (67), where it is provided with a longer residence time for thermal cracking reactions. The product vapors (68) exiting the coke drum are sent to the main fractionator column (69) for further separation into desired product fractions like offgas with LPG and naphtha (70), Kerosene (71), Light Coker Gas Oil (LCGO) (72), Heavy Coker Gas Oil (HCGO) (73) and Coker Fuel Oil (CFO) (74). The entry points of products from pre-cracking reactor and coke drum to the main fractionator may be suitably selected based on good engineering practices.

The original Indian Patent Application No. 4398/MUM/2015 for which this application is an addition, describes a process in which a common furnace is employed to heat the feed going into the pre cracking reactor and the coke drums. In the said scheme, the use of a common furnace limits the variation in temperature severity that can be applied for thermal cracking reactions in pre cracking reactor and coke drums. The embodiments of the present invention offers better thermal selectivity control of both delayed coking unit and pre cracking reactor thereby enabling optimized operating severities in both pre cracking reactor and coke drums, resulting in significant reduction in overall yield of coke. Reduction in coke yield ultimately results in increased efficiency of processing of heavy petroleum residue and the refinery as a whole.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims. Further, using a plug flow reactor as pre-cracking reactor minimizes back-mixing inside the reactor, which otherwise will affect the conversion rate as well as coke formation rate.

While specific language has been used to describe the disclosure, any limitations arising on account of the same are not intended. As would be apparent to a person in the art, various working modifications may be made to the method in order to implement the inventive concept as taught herein.

EXAMPLES

Pilot scale experimental study is carried out for validating the merits of the invented process schemes. Experiments are carried out with a resid feedstock of characteristics provided in Table-1.

TABLE 1

| Properties of resid feedstock | |
|---|---|
| Feed characteristics | Value |
| Density, g/cc | 1.042 |
| CCR, wt % | 23.39 |
| Asphaltene content, wt % | 7.8 |
| Sulfur, wt % | 5.73 |
| Liquid analysis (D2887/D6352) wt % | ° C. |
| 0 | 409 |
| 10 | 506 |
| 30 | 562 |
| 50 | 600 |
| 70 | 639 |
| 80 | 659 |
| 90 | 684 |
| 95 | 698 |
| Metal, ppm | |
| Fe | 6 |
| Ca | 3 |
| Cr | 1 |
| Si | 1 |

A base case experiment is carried out in the delayed coker pilot plant using the resid feedstock at delayed coking conditions. The operating conditions for all the experiments are 495° C., feed furnace outlet line temperature, 1.05 Kg/cm2 (g) coke drum pressure, 1 wt % steam addition to the coker feed and a feed rate maintained at about 8 kg/h. The operation is carried out in semi batch mode. The vapors from the coking drums are recovered as liquid and gas products and no coker product is recycled to the coker drum. Major operating parameters and the corresponding discrete product yield pattern are provided in Table-2.

TABLE 2

| Base case pilot plant experimental data with resid feedstock at delayed coker conditions. | | |
|---|---|---|
| Feed characteristics | Unit | Value |
| Feed rate | Kg/hr | 8 |
| Run duration | Hr | 12 |

TABLE 2-continued

Base case pilot plant experimental data with resid feedstock at delayed coker conditions.

| Coil Outlet Temperature | °C. | 495 |
| Drum pressure | kg/cm² | 1.05 |

| Yield (Basis: fresh feed) | Unit | Value |
| --- | --- | --- |
| Fuel gas | wt % | 6.82 |
| LPG | wt % | 5.66 |
| $C_5$-140° C. | wt % | 9.38 |
| 140-370° C. | wt % | 26.80 |
| 370° C.+ | wt % | 24.40 |
| Coke | wt % | 26.94 |

The yields obtained from the base case experiment as provided in Table-2 form the conventional Delayed coker unit (DCU) process yields for the resid feedstock taken.

In order to find the yields from invented process, a first experiment is carried out with the resid feedstock of Table-1 at mild thermal cracking conditions envisaged for the pre-cracker reactor. Heavy bottom material (370° C.+) generated from the pre-cracker reactor is separated in a fractionator/intermediate separator and this material is subjected to coking, in the delayed coker section. The major operating parameters for this experiment are provided in Table-3.

TABLE 3

Pilot plant experimental conditions maintained for the scheme of current invention

| Process conditions | Unit | Value |
| --- | --- | --- |
| Run duration | hrs | 12 |
| Feed rate | Kg/hr | 8 |
| Pre-cracker inlet temp | °C. | 436 |
| Pre-cracker outlet temp | °C. | 409 |
| Pre-cracker inlet pressure | Kg/cm²(g) | 12.3 |
| Pre-cracker outlet pressure | Kg/cm²(g) | 11.9 |
| Coil Outlet Temperature (for heavy bottom material from intermediate separator) | °C. | 495 |
| Drum pressure | Kg/cm²(g) | 1.05 |

From the experimental data the yields for the invented process scheme is estimated and is compared with the base case delayed coker yields, in Table-4.

TABLE 4

Comparison of yields obtained in invented process and the base case DCU yields

| | Invented process yields | Base case DCU yields | Yield improvement |
| --- | --- | --- | --- |
| Yields | Wt % | Wt % | ΔWt % |
| Fuel gas | 6.62 | 6.82 | -0.20 |
| LPG | 5.81 | 5.66 | +0.15 |
| $C_5$-140° C. | 9.4 | 9.38 | +0.02 |
| 140-370° C. | 35.01 | 26.80 | +8.21 |
| 370° C.+ | 21.66 | 24.40 | -2.74 |
| Coke | 21.5 | 26.94 | -5.44 |

The experimental data reported in Table-4 shows that there is improvement in diesel range product of about 8.21 wt % and reduction in coke and fuel oil yields of about 5.44 wt % and 2.74 wt % respectively for the process scheme of the present invention over the conventional delayed coking process.

Those of ordinary skill in the art will appreciate upon reading this specification, including the examples contained herein, that modifications and alterations to the composition and methodology for making the composition may be made within the scope of the invention and it is intended that the scope of the invention disclosed herein be limited only by the broadest interpretation of the appended claims to which the inventor is legally entitled.

The invention claimed is:

1. A method of reducing overall coke yield said method consisting of the steps of:
   (a) heating a hydrocarbon feedstock (40) in a reactor furnace (41) to obtain a hot feed (42);
   (b) introducing the hot feed (42) of step (a) in a pre-cracking reactor (43) wherein it undergoes mild thermal cracking reactions at a pressure in the range of 1 to 15 kg/cm² and a residence time in the range of 1 to 40 minutes to obtain an outlet product material stream (44);
   wherein the pre-cracking reactor is a plug flow reactor;
   wherein the pre-cracking reactor is operated at a temperature range of 370 to 470° C.;
   (c) passing the outlet product material stream (44) of step (b) to an intermediate separator (45) to split the outlet product material stream (44) into top fraction (46) and heavy bottom product (47) and transferring the top fraction (46) to a main fractionator (53);
   wherein the intermediate separator (45) is operated in the pressure range of 0.2 to 10 Kg/cm²;
   (d) heating the heavy bottom product (47) of step (c) in a coker furnace (49) to obtain a hot hydrocarbon stream (50); wherein the heavy bottom product (47) is mixed with a Clarified Oil (CLO) stream (48) prior to heating in the coker furnace (49);
   (e) transferring the hot hydrocarbon stream (50) of step (d) to preheated coke drums (51) where it undergoes severe thermal cracking reactions at a temperature in the range of 470 to 520° C., a pressure in the range of 0.5 to 5 kg/cm² and a residence time of more than 10 hours to obtain product vapors (52); and
   (f) passing the product vapors (52) of step (e) to the main fractionator (53) to obtain desired product fractions (54, 55, 56, 57, 58);
   wherein the hydrocarbon feedstock (40) of step a) is obtained by feeding a resid feed (39) selected from vacuum residue, atmospheric residue, deasphalted pitch, shale oil, coal tar, heavy waxy distillates, foots oil, slop oil or blends thereof, into a bottom section of the main fractionator (53) and obtained as a bottom fraction from the main fractionator (53), prior to heating in the reactor furnace, wherein the resid feed (39) is introduced into the bottom section of the main fractionator (53) below a location where the top fraction (46) and the product vapors (52) enter the main fractionator (53);
   wherein the hydrocarbon feedstock of step a) has conradson carbon residue content of above 4 wt % and density of at least 0.95 g/cc.

2. The method as claimed in claim 1, wherein the product fractions are LPG and naphtha, Kerosene, LCGO, HCGO and Coker Fuel Oil (CFO).

* * * * *